US012654402B2

(12) United States Patent
Harper et al.

(10) Patent No.: US 12,654,402 B2
(45) Date of Patent: Jun. 16, 2026

(54) CURE ACCELERATION OF THERMAL INTERFACE ADHESIVES VIA ADJACENT COMPONENT HEATING

(71) Applicant: GM GLOBAL TECHNOLOGY OPERATIONS LLC, Detroit, MI (US)

(72) Inventors: Jared C. Harper, Lake Orion, MI (US); Simon James Hammond Trask, Royal Oak, MI (US)

(73) Assignee: GM GLOBAL TECHNOLOGY OPERATIONS, Detroit, MI (US)

( * ) Notice: Subject to any disclaimer, the term of this patent is extended or adjusted under 35 U.S.C. 154(b) by 117 days.

(21) Appl. No.: 18/494,856

(22) Filed: Oct. 26, 2023

(65) Prior Publication Data

US 2025/0135730 A1 May 1, 2025

(51) Int. Cl.
*B29C 65/00* (2006.01)
*B29C 35/04* (2006.01)
*B29L 31/34* (2006.01)

(52) U.S. Cl.
CPC ............ *B29C 66/034* (2013.01); *B29C 35/04* (2013.01); *B29L 2031/3468* (2013.01)

(58) Field of Classification Search
CPC ... B29C 66/034; B29C 35/04; B29C 65/4835; B29L 2031/3468; Y02E 60/10
See application file for complete search history.

(56) References Cited

U.S. PATENT DOCUMENTS

| | | | | |
|---|---|---|---|---|
| 2013/0218534 A1* | 8/2013 | Hill | ...................... | G01N 25/486 |
| | | | | 703/2 |
| 2016/0301117 A1* | 10/2016 | Tyler | ................. | H01M 10/0525 |
| 2017/0271726 A1* | 9/2017 | Shen | ................... | H01M 10/653 |
| 2024/0243407 A1* | 7/2024 | Ishikawa | ............. | H01M 50/293 |
| 2025/0079605 A1* | 3/2025 | Wu | ....................... | H01M 10/61 |

* cited by examiner

*Primary Examiner* — S. Behrooz Ghorishi
(74) *Attorney, Agent, or Firm* — CANTOR COLBURN LLP

(57) ABSTRACT

Aspects of the disclosure include systems and methods that leverage adjacent component heating to accelerate the cure time of thermal interface adhesives. An exemplary method can include receiving a battery pack and a thermal management system including a cooling plate, an upper tray, and a lower tray joined to opposite surfaces of the cooling plate to define an enclosed volume therebetween. The method includes wetting an interface between the battery pack and the thermal management system with an adhesive and joining the battery pack to the thermal management system at the interface. The method includes directing a heating fluid through the enclosed volume, thereby heating the adhesive. The method includes, responsive to determining that a temperature of the adhesive has reached a target temperature, maintaining the temperature for a soak time according to a cure curve of the adhesive to achieve a target bond strength.

20 Claims, 7 Drawing Sheets

CURE ACCELERATION OF THERMAL INTERFACE ADHESIVES VIA ADJACENT COMPONENT HEATING

INTRODUCTION

The subject disclosure relates to battery cell technologies, and particularly to the cure acceleration of thermal interface adhesives via adjacent component heating.

High voltage electrical systems are increasingly used to power the onboard functions of both mobile and stationary systems. For example, in motor vehicles, the demand to increase fuel economy and reduce emissions has led to the development of advanced electric vehicles (EVs). EVs rely upon a Rechargeable Energy Storage System (RESS), which typically includes one or more high voltage battery packs, and an electric drivetrain to deliver power from the battery to the wheels. Battery packs can include any number of interconnected battery modules depending on the power needs of a given application. Each battery module includes a collection of conductively coupled electrochemical cells. The battery pack is configured to provide a Direct Current (DC) output voltage at a level suitable for powering a coupled electrical and/or mechanical load (e.g., an electric motor).

Modern automotive high voltage battery packs often use adhesives and sealers to join structural components and to manage various dynamic behaviors internal to the battery pack. For example, adhesives could be used to retain battery cells during high acceleration events, to reduce the thermal resistance of a gap between the power electronics or battery cell and the heat sink assemblies, and/or to restrict access of gases or liquids inside the pack to specific areas or from exiting the battery pack assembly. There are many properties that are important to the performance of an adhesive or sealer in a battery and those properties can vary depending on the needs of a particular application. However, regardless of an adhesive's primary function adhesion strength, bulk strength, and young's modulus are determinative for maintaining a necessary bond that prevents separation of a respective joint.

SUMMARY

In one exemplary embodiment a method for leveraging adjacent component heating to accelerate the cure time of thermal interface adhesives can include receiving a battery pack and a thermal management system including a cooling plate, an upper tray, and a lower tray joined to opposite surfaces of the cooling plate to define an enclosed volume therebetween. The method includes wetting an interface between the battery pack and the thermal management system with an adhesive and joining the battery pack to the thermal management system at the interface. The method includes directing a heating fluid through the enclosed volume, thereby heating the adhesive. The method includes, responsive to determining that a temperature of the adhesive has reached a target temperature, maintaining the temperature for a soak time according to a cure curve of the adhesive to achieve a target bond strength.

In addition to one or more of the features described herein, in some embodiments, the method includes generating a cure curve for a plurality of adhesives at one or more temperatures, each cure curve defining a bond strength of the respective adhesive as a function of cure time.

In some embodiments, the method includes determining a target open time and selecting the adhesive from the plurality of adhesives according to the target open time and the respective cure curves. In some embodiments, the method includes selecting the adhesive that satisfies the target open time at a known manufacturing temperature.

In some embodiments, the method includes coupling the cooling plate to a leak check machine and directing heated air through the enclosed volume.

In some embodiments, the enclosed volume includes one or more fluid flow channels, a fluid inlet, and a fluid outlet for circulation of the heating fluid.

In some embodiments, the method includes adjusting one or more of a flowrate and a temperature of the heating fluid responsive to the temperature of the adhesive.

In another exemplary embodiment a method for leveraging adjacent component heating to accelerate the cure time of thermal interface adhesives can include receiving a first battery cell and a second battery cell and wetting an interface between the first battery cell and the second battery cell with an adhesive. The method includes joining the first battery cell and the second battery cell at the interface and directing a charging current to at least one of the first battery cell and the second battery cell, thereby heating the adhesive. The method includes, responsive to determining that a temperature of the adhesive has reached a target temperature, maintaining the temperature for a soak time according to a cure curve of the adhesive to achieve a target bond strength.

In some embodiments, the method includes generating a cure curve for a plurality of adhesives at one or more temperatures, each cure curve defining a bond strength of the respective adhesive as a function of cure time.

In some embodiments, the method includes determining a target open time and selecting the adhesive from the plurality of adhesives according to the target open time and the respective cure curves.

In some embodiments, the method includes selecting the adhesive that satisfies the target open time at a known manufacturing temperature.

In some embodiments, the method includes coupling the first battery cell and the second battery cell to a charge port and directing a Direct Current Fast Change (DCFC) to the first battery cell and the second battery cell via the charge port. In some embodiments, the DCFC directed to the first battery cell and the second battery cell is a first DCFC of a vehicle battery pack comprising the first battery cell and the second battery cell.

In some embodiments, the method include adjusting the charging current responsive to the temperature of the adhesive.

In yet another exemplary embodiment a system includes a vehicle having an electric motor, a battery pack electrically coupled to the electric motor, the battery pack including a first battery cell and a second battery cell, and a thermal management system coupled to the battery pack, the thermal management system including a cooling plate, an upper tray, and a lower tray joined to opposite surfaces of the cooling plate to define an enclosed volume therebetween. The system further includes a memory, computer readable instructions, and one or more processors for executing the computer readable instructions. The computer readable instructions control the one or more processors to perform operations. The operations include heating a component of the vehicle adjacent to an adhesive. In some embodiments, heating the component includes at least one of: directing a heating fluid through the enclosed volume to heat the cooling plate, thereby heating the adhesive and directing a charging current to at least one of the first battery cell and the second battery cell to heat the respective first battery cell and second battery cell, thereby heating the adhesive. The operations include measuring a temperature of the adhesive and, responsive to determining that the temperature has reached a target temperature, maintaining the temperature for a soak time according to a cure curve of the adhesive to achieve a target bond strength.

In some embodiments, the operations further include generating a cure curve for a plurality of adhesives at one or more temperatures, each cure curve defining a bond strength of the respective adhesive as a function of cure time.

In some embodiments, the operations further include determining a target open time and selecting the adhesive from the plurality of adhesives according to the target open time and the respective cure curves.

In some embodiments, the operations further include selecting the adhesive that satisfies the target open time at a known manufacturing temperature.

In some embodiments, the operations further include coupling the cooling plate to a leak check machine and directing heated air through the enclosed volume.

In some embodiments, the operations further include coupling the first battery cell and the second battery cell to a charge port and directing a DCFC to the first battery cell and the second battery cell via the charge port.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
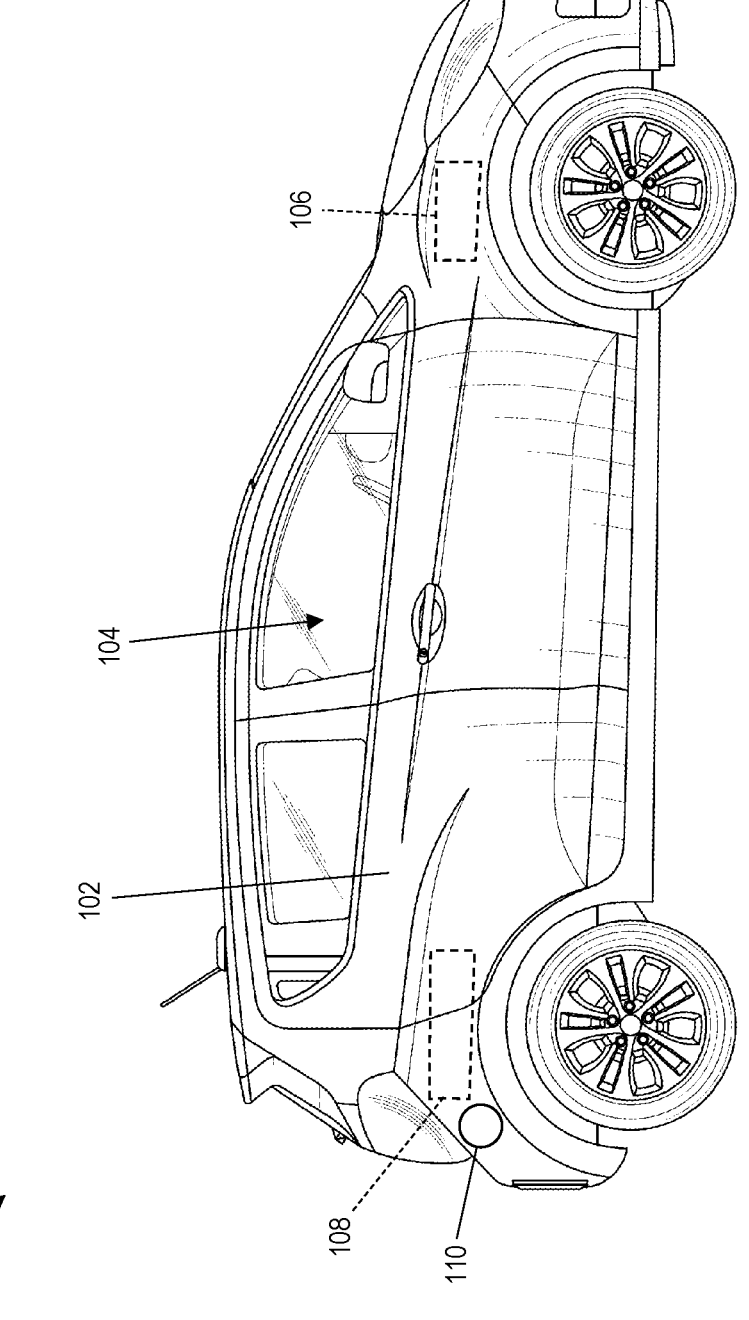
FIG. 1 is a vehicle configured in accordance with one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

As discussed previously, modern automotive high voltage battery packs rely on adhesives and sealers to join various structural components and to manage dynamic behaviors internal to the battery pack. Many adhesives, such as thermal interface adhesives, require a cure time to reach a design target for adhesive strength (e.g., a target lap shear strength). Different adhesives are designed to have different cure schedules, and the two parameters most important to manufacturing are the open time and the time to fixture strength (also referred to as time to green).

The open time defines the amount of time after an adhesive is applied to a joint surface that is available before the adhesive and joint needs to be compressed together. In other words, the open time is the workable time for the adhesive, after which the adhesive is no longer pliable. Open times can be a function of the underlying materials of the adhesive. For example, the open time for a so-called "2K" (two component chemical reaction) adhesive material is the time available for working the adhesive prior to the chemical reaction proceeding to the point where the adhesive is fixed.

Time to fixture strength defines the time a joint bound by a respective adhesive needs to achieve to reach a certain required strength so that the joint and any bound components at the joint can be moved freely without separation. For reference, the target adhesive strength for a battery pack can be 0.5 MPa, and the time to fixture strength is the time to reach a strength of 0.5 MPa. Moving the battery pack prior to satisfying the time to fixture strength can result in separation at the joint.

An ideal adhesive might have an arbitrarily long open time (so that the joint and components can be manipulated as needed without time constraints) and a tight, controllable time to fixture strength (so that the joint/components can be finalized as soon as possible following conclusion of the open time). For many adhesives, such as 2K adhesives, the open time and the time to fixture strength are competing material properties. In particular, the open time and the time to fixture strength are often positively and proportionally correlated such that designing an adhesive to provide a longer open time necessarily results in increasing the time to fixture strength and, conversely, designing an adhesive with a relatively short time to fixture strength necessarily results in a relatively short open time.

The tradeoff between open time and time to fixture strength is especially relevant to service environments, which desire long open (working) time materials, resulting in proportionally longer cure times. For example, an adhesive having a 30 minute working time can require a 7 day cure, and modifying the adhesive in service for a 60 minute working time can result in a 14 day cure. For many service scenarios a 14 day cure is not available, and the result is a real constraint on the maximum available open time.

For some applications, the inherent conflict between the open time and the time to fixture strength can be wholly or partially resolved by subjecting the adhesive to heat after fixing the joint. Heating an adhesive can accelerate the curing process, resulting in a relatively shorter time to fixture strength. For example, open air/oven systems and/or ultraviolent (UV) curing platforms can be used for this task. Unfortunately, open air/oven based systems can only be used when the joint/component(s) themselves can fit within the heating system and UV curing platforms require physical access (or unobstructed line of sight) to the adhesive. Due to the complexity and packaging limitations of battery assemblies, adhesive joints can be very large, spanning up to the order of square meters, and can be largely inaccessible after the assembly process, meaning that open air/oven systems would need to accommodate the entire platform and UV delivery is not always possible or requires at least partial component disassembly. Another constraint is that open air/oven systems inherently apply whole-system (global) heat to the entire joint/component(s) placed within the oven/heating system. In many scenarios, such as with battery cell platforms, one or more of the components cannot be subjected to these elevated oven temperatures without exceeding temperature limits.

This disclosure introduces the use of adjacent component heating to accelerate the cure time of thermal interface adhesives. Rather than relying on an indiscriminate, global heating system for cure acceleration, described herein is a method for delivering targeted heating to a thermal interface adhesive to accelerate (shorten) the time to fixture strength. In some embodiments, a component coupled to the adhesive is heated and this heat is transferred conductively into the adhesive. In some embodiments, the component is heated using preexisting rails. As used herein, a "preexisting rail" refers to an existing component of a system that can be leveraged to deliver heat to an adhesive. For example, a fluid (e.g., heated air, coolant, etc.) can be pumped through channels in a coolant system of a Rechargeable Energy Storage System (RESS) during RESS assembly to locally heat a cold plate and this heat can be conductively transferred to an adhesive coupled to the cold plate. In another example, a high-current charge profile (e.g., a vehicle's first Direct Current Fast Change, DCFC) can be used to locally heat battery cells after vehicle production and/or service and this heat can be conducted into an attached adhesive within a battery pack to accelerate the cure speed.

Leveraging preexisting rails (e.g., channels in a coolant system, battery charging lines/elements, etc.) to deliver a targeted heating to an adhesive via adjacent component heating in accordance with one or more embodiments offers several technical advantages over other approaches to adhesive cure acceleration. Notably, by introducing heat to an adhesive conductively after the joint is closed, the open time can be maintained while accelerating the time to fixture strength. In other words, aspects of the present disclosure decouple an adhesive's open time from the time to fixture strength. Leveraging adjacent component heating (preexisting rails) in this manner provides a greater degree of heating control over prior systems and at a lower total plant footprint than open air/oven based systems. In addition, reducing the time to fixture strength directly reduces the number of banked modules stored within a manufacturing workflow and also enables the use of adhesives with longer open times by minimizing the resulting increased time to handling strength. Other advantages are possible. For example, heating a 2K adhesive in this manner will reduce the remaining cure time by a factor of 50 percent for roughly every 10 degrees Celsius, allowing the use of adhesives with longer open times without the cost of an increased time to achieve a target handling strength.

In another example, heating a battery cell of an RESS to a cell maximum operating temperature (e.g., 60 degrees Celsius) for up to one hour will allow thermally-cured adhesives to be formulated to provide long room temperature working and open times (e.g., on the order of hours or even days) without sacrificing the time to fixture strength. In particular, directed heating can be applied using adjacent component heating after a servicing, manufacturing, and/or maintenance task is completed to provide a cure accelerant once the packs are fixtured and handling strength is needed to meet shipping and handling loads.

In yet another example, existing components, such as the RESS coolant system or battery cells, can be heated using preexisting rails, such as integrated fluid and/or electrical channels, and this heat can be transferred conductively into an adhesive at a lower total heat energy than required for global heating systems, relatively reducing the likelihood of exceeding individual component (e.g., battery cell) temperature limits and enabling significant time and energy savings as well as efficiency improvements.

A vehicle, in accordance with an exemplary embodiment, is indicated generally at 100 in FIG. 1. Vehicle 100 is shown in the form of an automobile having a body 102. Body 102 includes a passenger compartment 104 within which are arranged a steering wheel, front seats, and rear passenger seats (not separately indicated). Within the body 102 are arranged a number of components, including, for example, an electric motor 106 (shown by projection under the front hood). The electric motor 106 is shown for ease of illustration and discussion only. It should be understood that the configuration, location, size, arrangement, etc., of the electric motor 106 is not meant to be particularly limited, and all such configurations (including multi-motor configurations) are within the contemplated scope of this disclosure.

The electric motor 106 is powered via a battery pack 108 (shown by projection near the rear of the vehicle 100). The battery pack 108 is shown for ease of illustration and discussion only. It should be understood that the configuration, location, size, arrangement, etc., of the battery pack 108 is not meant to be particularly limited, and all such configurations (including split configurations) are within the contemplated scope of this disclosure. Moreover, while the present disclosure is discussed primarily in the context of a battery pack 108 configured for the electric motor 106 of the vehicle 100, aspects described herein can be similarly incorporated within any system (vehicle, building, or otherwise) having an energy storage system(s) (e.g., one or more battery packs or modules), and all such configurations and applications are within the contemplated scope of this disclosure.

In some embodiments, the battery pack 108 is recharged via a charge port 110. The charge port 110 is shown for ease of illustration and discussion only. It should be understood that the configuration, location, size, arrangement, etc., of the charge port 110 is not meant to be particularly limited, and all such configurations are within the contemplated scope of this disclosure.

As will be detailed herein, components of the vehicle 100, such as the battery pack 108 and the charge port 110, can be leveraged to deliver a targeted heating, via adjacent component heating, to one or more adhesives. In some embodiments, the battery cells of the battery pack 108 are put under load (e.g., DCFC) and the resultant heat of the battery cells is conducted into an attached adhesive(s) to accelerate the curing (e.g., to reduce the time to fixture strength) of those adhesives (refer to FIG. 2). In some embodiments, channels in a thermal management system are leveraged to heat a cooling plate, and the resultant heat of the cooling plate is conducted into an attached adhesive(s) for cure acceleration (refer to FIG. 3).

Figure 2:
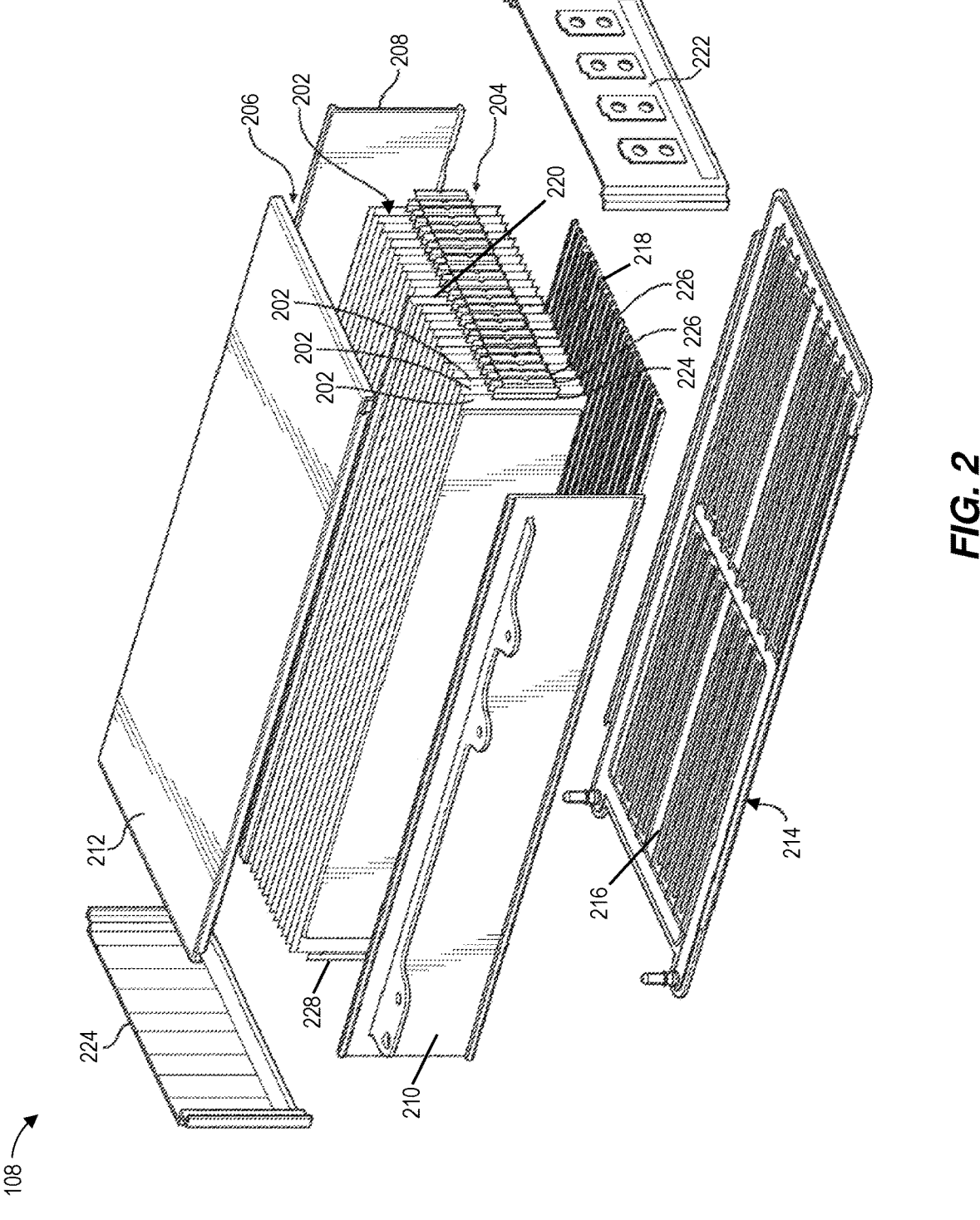
FIG. 2 is a battery pack configured in accordance with one or more embodiments.

FIG. 2 illustrates an example configuration of a battery pack (e.g., the battery pack 108 of FIG. 1) in accordance with one or more embodiments. As shown in FIG. 2, the battery pack 108 includes a plurality of battery cells 202 arranged in a battery stack 204. Each of the battery cells 202 in the battery pack 108 generates and stores electrical energy through heat-producing electro-chemical reactions. Note that FIG. 2 depicts the battery pack 108 in a disassembled state for ease of illustration and discussion.

In some embodiments, the battery pack 108 includes an enclosure or housing 206. The housing 206 is configured to maintain arrangement of the battery cells 202 in the battery stack 204, protect the battery cells 202 from damage, and facilitate mounting of the battery pack 108 in its operative environment (such as in the vehicle 100 of FIG. 1 as discussed previously). In some embodiments, the housing 206 includes a first side plate 208, a second side plate 210, and a cover or top plate 212 attached to the first side plate 208 and the second side plate 210.

In some embodiments, the battery pack 108 includes a thermal management system 214 configured to manage heat transfer from the battery stack 204 to the environment. In some embodiments, the thermal management system 214 includes a cooling plate 216 (also referred to as a cold plate). In some embodiments, the thermal management system 214 and/or the cooling plate 216 is attached to the first side plate 208 and/or the second side plate 210 to secure the battery stack 204 within the housing 206.

In some embodiments, an adhesive layer 218 is applied between the cooling plate 216 and the battery stack 204 to secure the battery stack 204 to the thermal management system 214. In some embodiments, the battery cells 202 include one or more adhesive layer(s) 220 to join the various cells together. In some embodiments, the battery pack 108 includes one or more additional adhesives (not separately shown) to join any combination of the various internal components of the battery pack 108. As described previously, the adhesive layer 218, the adhesive layer 220, and/or any other adhesives can be heated for cure acceleration. The cure acceleration of thermal interface adhesives via adjacent component heating is described in greater detail below (refer to "Adjacent Component Heating for Adhesive Cure Acceleration").

As further shown in FIG. 2, in some embodiments, the battery pack 108 includes a first inter-connect board (ICB) 222 and a second ICB 224. In some embodiments, the ICBs 222, 224 can be attached to, such as pre-assembled with, the top plate 212. Accordingly, the ICBs 222, 224, the first side plate 208, the second side plate 210, the top plate 212, and the cooling plate 216 define an enclosure (the housing 206) of the battery pack 108.

In some embodiments, each of the battery cells 202 of the battery stack 204 includes first terminals 226 (also referred to as electrical terminal or contact tabs) and second terminals 228, each arranged on opposite ends of a respective battery cell as shown. In some embodiments, one of the first terminals 226 and the second terminals 228 are positive terminals, and the others are negative terminals. In some embodiments, the first terminals 226 are electrically coupled to the first ICB 222, and the second terminals 228 are coupled to the second ICB 224. The first ICB 222 and/or the second ICB 224 can be electrically coupled, directly or indirectly, to a charge port (e.g., the charge port 110 of FIG. 1) to deliver an electrical charge (current) to the battery cells 202.

Adjacent Component Heating for Adhesive Cure Acceleration

An overall process for leveraging adjacent component heating for adhesive cure acceleration can include one or more of the following steps.

STEP 1. Create one or more strength versus time cure curves (also referred to as a cure schedule) for one or more adhesives across various elevated temperatures. For example, a cure schedule can be created for a first adhesive at temperatures of 25 degrees Celsius, 35 degrees Celsius, and 45 degrees Celsius. In some embodiments, a strength versus time cure curve is created for one or more temperatures up to a temperature limit. The temperature limit can include, for example, a maximum (design or limit) cell surface temperature.

STEP 2. Evaluate a required open time (e.g., working time) for a given application (e.g., battery module assembly during manufacturing, RESS remanufacturing during servicing, etc.) and select and/or design an adhesive having a strength versus time cure curve (refer to STEP 1) that satisfies the required open time at any of the temperatures that are acceptable. In some embodiments, an adhesive can be modified to increase the open time by modifying an amount of catalyst in the adhesive, although other techniques for modifying adhesive open times are known and all such techniques are within the contemplated scope of this disclosure. In some embodiments, an adhesive is selected such that it meets these requirements up to a plant limit temperature (e.g., 30 degrees Celsius).

STEP 3. Mate two or more components and wet out the adhesive. For example, during assembly, place an adhesive (e.g., the adhesive layer 218) on a surface of a component interface (e.g., between the cooling plate 216 and the battery stack 204, etc.) and join the respective components. Advantageously, the adhesive can be selected to have a long open time, as described previously, relaxing time constraints on Step 3.

STEP 4. Adjacent component heating. In some embodiments, a component adjacent to the adhesive (refer to STEP 3) is heated using one or more preexisting rails. For example, the cooling plate 216 adjacent to the adhesive layer 218 can be attached to a leak check machine or other fluid source and a heated fluid, such as heated air, can be run through the cooling plate 216. Passing a heated fluid through the cooling plate 216 causes the cooling plate 216 to heat up convectively and this heat is passed conductively into the adhesive layer 218. In some embodiments, the heated fluid is passed through the cooling plate 216 for a time specified according to the cure curve (refer STEP 1) to achieve a targeted bond strength. For example, the heated fluid can be pass through the cooling plate 216 for a time equal to the delta between the adhesive open time and the handling (fixture strength) time at the respective temperature, allowing for any additional time to bring the respective adhesive to the target temperature). In this manner, the adhesive can achieve a required strength to continue production.

In some embodiments, the adhesive (e.g., the adhesive layer 218 and/or the adhesive layer 220) includes a relatively low interfacial thermal resistance (i.e., a lower interfacial thermal resistance than the battery stack 204), a relatively low thermal mass (as compared, e.g., to the cooling plate 216 and the battery stack 204), and a relatively thin through plane bond line (i.e., a lower thickness orthogonal to the heating path than the other components). In this manner, the adhesive will heat at a faster rate than other interfacing components (e.g., the battery stack 204). Note that, while the adjoining cell (e.g., the battery cells 202 of the battery stack 204) will begin to increase in temperature due to the high thermal conductivity of the adhesive layer 218 thermal interface, the cell internals' significantly higher thermal mass and interfacial resistance through the electrolyte to the cell external surface will result in the adhesive layer 218 reaching the necessary temperatures prior to the cell internals reaching thermal limits.

In some embodiments, heating of the adhesive is precisely controlled by manipulation of the flow rate and/or temperature of the heating fluid passed through the preexisting rails (e.g., manifolds of the thermal management system 214). In some embodiments, heating of the adhesive is controlled such that the temperature of any of the surrounding components does not exceed thermal limit conditions or critical performance thresholds.

STEP 5. Additional adjacent component heating. After production of the vehicle (e.g., the vehicle 100 of FIG. 1) is complete, adjacent component heating can be again relied upon to achieve a final (maximum) bond strength for the adhesive. For example, a charge port (e.g., the charge port 110) can be energized to deliver a current to a battery (e.g., the battery pack 108), resulting in one or more battery cells (e.g., the battery cells 202) to heat up. This heat can be conductively passed into an adhesive (e.g., the adhesive layers 220) in a similar manner as discussed with respect to STEP 4. In some embodiments, the first charge cycle for the battery is leveraged for adjacent component heating by holding the battery at a higher temperature for a time specified according to the cure curve (refer STEP 1) to achieve a final bond strength. In some embodiments, electrical heating of the battery/battery cells in this manner is controlled (via, e.g., the charge port 110 and/or a computer or ECU of the vehicle, refer to FIG. 5) to ensure heating of the respective adhesive without exceeding the current and/or temperature limits for the battery and/or cells.

Observe that STEP 4 and STEP 5 illustrate physical and electrical preexisting rails, respectively, for adjacent component heating. In some embodiments, one or both of steps 4 and 5 are optional. In some embodiments, one or both of steps 4 and 5 rely upon another preexisting rail. For example, STEP 4 can be modified to rely instead upon the electrical system (refer STEP 5) and STEP 5 can be modified to rely upon the cooling system (refer STEP 4). Other configurations using other preexisting rails are possible and all such configurations are within the contemplated scope of this disclosure.

While it should be appreciated that these techniques (any of STEPS 1 to 5) can be used at any time for cure acceleration of a targeted adhesive, a few illustrative example scenarios are provided.

Option 1: Manufacturing Aid. For adhesives (e.g., TIMs) that have a cure time of less than 4 hours the use of adjacent component heating for cure acceleration can further reduce the time it takes the respective adhesive to reach a targeted handling strength requirement (e.g., 0.5 MPa). In this manner, manufacturing can finalize and flip a battery pack and continue production, reducing the number of banked modules.

Option 2: Final Cure to Vehicle Lot. For adhesives (e.g., TIMs) without manufacturing aid requirements (e.g., a 7-day cure), the respective vehicle can be leveraged for controlled adhesive heating by using its first charge cycle to heat the adhesive(s), reducing the time required to reach full (or design target) strength.

Option 3: Vehicle Release after RESS Remanufacturing. Service environments can require long working and open time materials and proportionally longer cure times. For example, for a 30-minute working time/7-day cure adhesive to be modified in service for a 60 minute working time, it will take 14 days to cure. For safety and structurally critical adhesives it can be prohibitive to prevent vehicle release to the customer for these extended durations post-RESS repair. Instead, the serviceable adhesive's cure can be accelerated by implementing a low to high state-of-charge DCFC charge after RESS repair on the respective vehicle to allow release to the customer in a matter of one to two days instead of potentially weeks.

Figure 3:
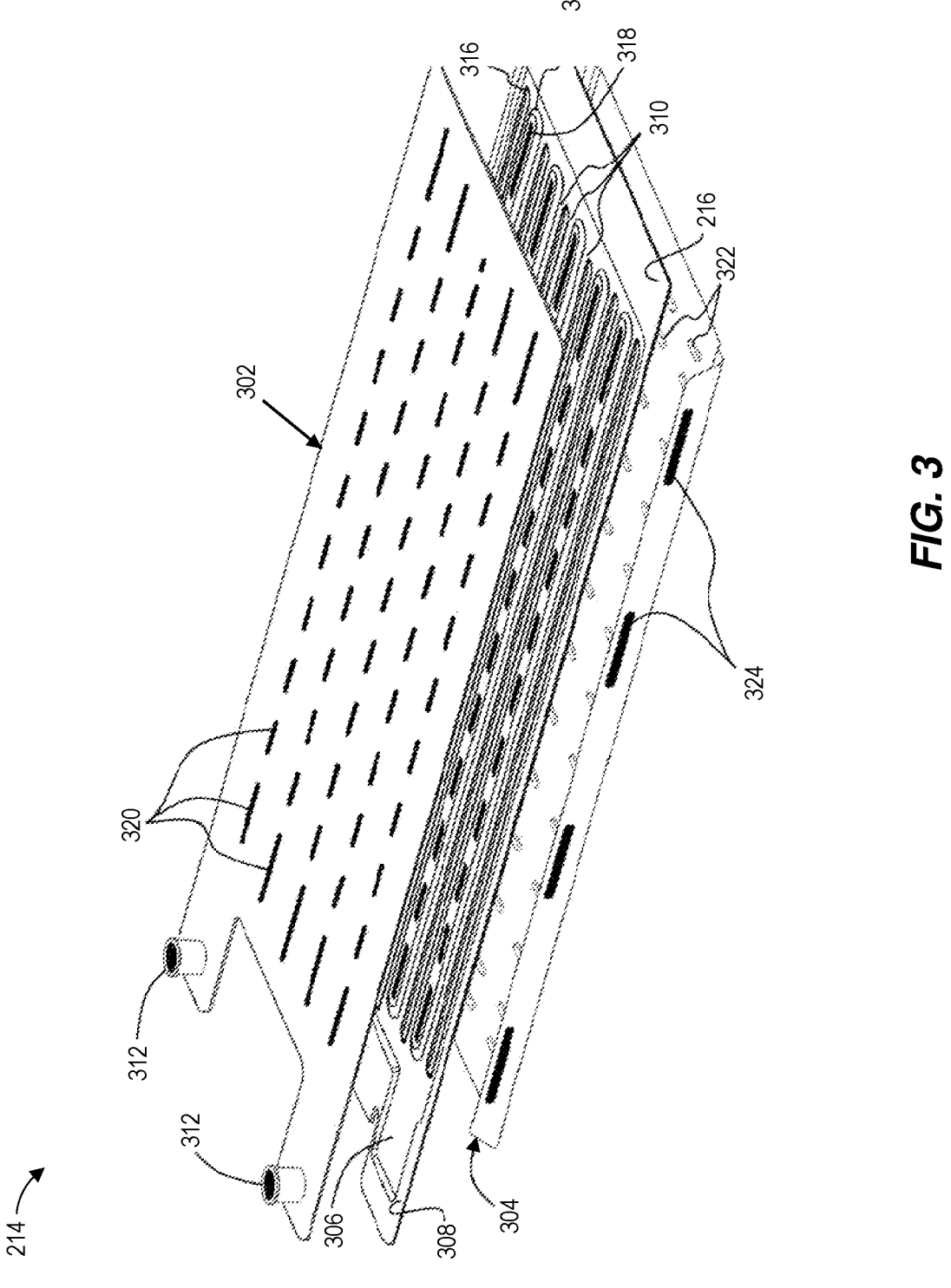
FIG. 3 is a thermal management system of the battery pack of FIG. 2 configured in accordance with one or more embodiments.

FIG. 3 illustrates an example configuration of a thermal management system (e.g., the thermal management system 214 of FIG. 2) in accordance with one or more embodiments. As shown in FIG. 3, the thermal management system 214 includes the cooling plate 216. In some embodiments, the cooling plate 216 can operate via air cooling. In some embodiments, the cooling plate 216 can operative via a cooling fluid (not separately shown).

In some embodiments, the thermal management system 214 can include an upper tray 302 and a lower tray 304 sealably joined to opposite surfaces of the cooling plate 216 to define an enclosed volume 306 therebetween. In some embodiments, the cooling plate 216 can include a peripherally disposed, raised lip 308. In some embodiments, the cooling plate 216 and the upper tray 302 can be complementarily shaped to allow sealable joining around the perimeter of the cooling plate 216 at the raised lip 308.

In some embodiments, the enclosed volume 306 can include one or more fluid flow channels 310 and fluid inlet and outlet couplings 312 to enable circulation of a cooling fluid (not separately shown) through the enclosed volume 306. While not meant to be particularly limited, the cooling fluid can include, for example, air, water, glycols (e.g., ethylene glycol, propylene glycol, etc.), dielectric fluids (e.g., mineral oils, synthetic oils, etc.), fluorinated liquids (e.g., perfluorocarbons (PFCs)), hydrofluoroolefins, coolant mixtures, and/or phase change materials (PCMs).

As discussed previously, in some embodiments, heat is applied to an adhesive (e.g., the adhesive layer 318, the adhesive layers 218, 220 of FIG. 2, etc.) by flowing a heating fluid (air, water, the cooling fluid itself after heating, etc.) through the preexisting fluid flow channels 310 provided for the cooling fluid. Alternatively, or in addition, in some embodiments, the cooling plate 216 can be provided with one or more dedicated channels (any of the fluid flow channels 310) specifically reserved for the heating fluid.

In some embodiments, the cooling plate 216 includes one or more elongated ribs 314 defining the fluid flow channels 310 (also referred to as coolant or refrigerant circulation tubes). In some embodiments, the ribs 314 rise from a bottom surface 316 of the cooling plate 216 to contact an opposite side (not separately shown) of the upper tray 302. In some embodiments, the ribs 314, the upper tray 302, and the raised lip 308 can be complementarily shaped and sealably joined to define the enclosed volume 306.

In some embodiments, the ribs 314 can include one or more through slots 318 and the upper tray 302 can include one or more complementary through slots 320. As used herein, the slots are "complementary" in that they are physically aligned (i.e., such that they are vertically stacked). In some embodiments, sealable joints (not separately shown) are made around a perimeter of the through slots 318, 320 at the interface of the ribs 314 and the upper tray 302.

The ribs 314 can be arranged as desired, and may be, for example, periodic and discontinuous (as shown). In other embodiments, the ribs 314 can be made of a singular shape that is continuous along the length of the ribs 314 (not separately shown).

In some embodiments, the lower tray 304 serves as a carrier engaged with the cooling plate 216. In some embodiments, the lower tray 304 can include one or more support ribs 322 which extend upwardly to engage with the under-side of the ribs 314. The support ribs 322 may be elongated transverse (as shown) to the elongated ribs 314 and/or elongated along (not separately shown) the length of the ribs 314. In some embodiments, the lower tray 304 includes attachment slots 324 to engage with ramped or barbed retention features (not shown) of an external component (e.g., portions of the battery pack 108 and/or mounting structures within the vehicle 100).

The upper tray 302, lower tray 304, and the cooling plate 216 can be made of metal or metal alloys. For example, in some embodiments, the upper tray 302, lower tray 304, and/or the cooling plate 216 can be manufactured from clad aluminum alloy sheet stock. The ribs 314, through slots 318, 320, support ribs 322, and/or attachment slots 324 can be punched, cut (such as by laser or water jet processes), or alternatively manufactured. Variable height features (e.g., ribs 314, raised lip 308, etc.) can be press formed, roll formed, hydroformed, or alternatively manufactured. The upper tray 302, lower tray 304, and the cooling plate 216 can be sealably joined by any effective bonding process including, for example, brazing.

Figure 4:
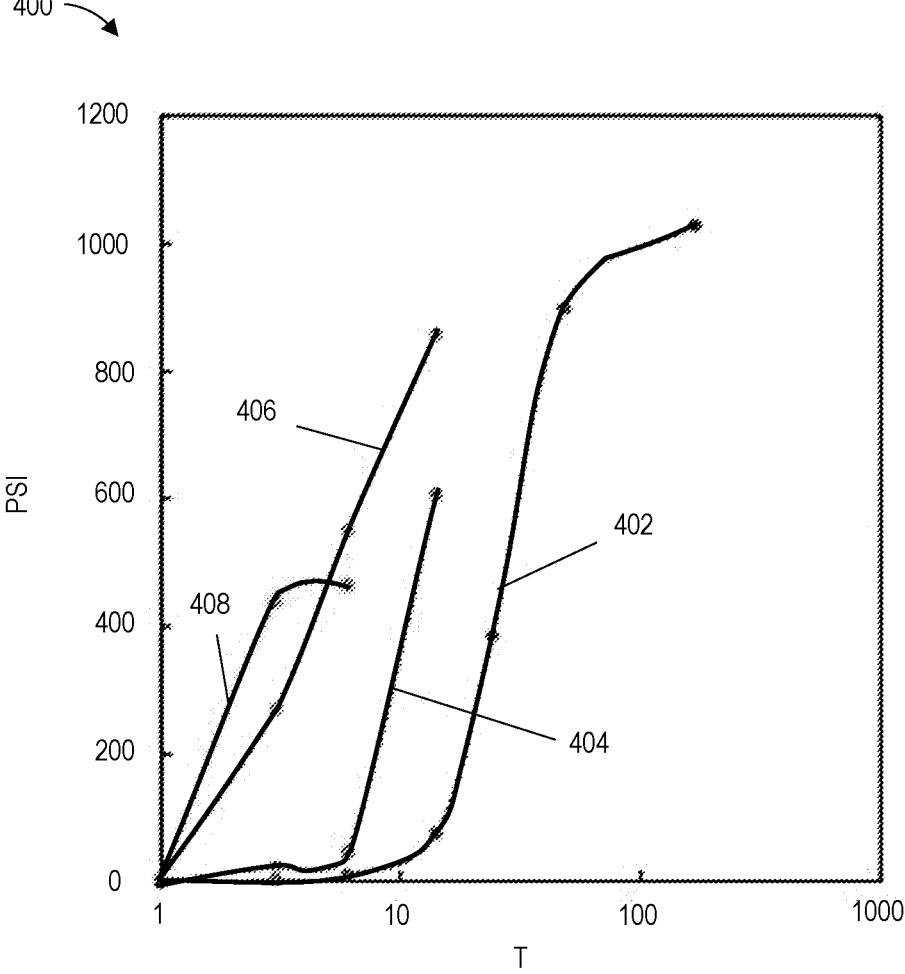
FIG. 4 is a graph depicting the relationship between bond strength and time in accordance with one or more embodiments.

FIG. 4 illustrates a graph 400 depicting the relationship between a measure of bond strength, lap shear strength (measured in PSI along the Y-axis) and time (measured in semi-log hours along the X-axis) for example adhesives in accordance with one or more embodiments. FIG. 4 shows a first cure curve 402, a second cure curve 404, a third cure curve 406, and a fourth cure curve 408. In some embodiments, the first cure curve 402 depicts a cure curve for a first adhesive at a first temperature (e.g., 25 degrees Celsius), the second cure curve 404 depicts a cure curve for the first adhesive at a second temperature (e.g., 35 degrees Celsius), the third cure curve 406 depicts a cure curve for the first adhesive at a third temperature (e.g., 45 degrees Celsius), and the fourth cure curve 408 depicts a cure curve for a second adhesive at the first temperature (e.g., 25 degrees Celsius). The cure curves 402, 404, 406, and 408 are merely illustrative, and it should be readily understood that any number of cure curves for any number of adhesives and for any temperatures can be similarly created and all such configurations are within the contemplated scope of this disclosure.

Observe, from FIG. 4, that lap shear strength increases over time. Observe further that, for the same adhesive, the time required to achieve a specified (e.g., target) lap shear strength decreases as temperature increases. In some embodiments, the cure curves 402, 404, 406, and 408 (and any other cure curve, as described previously) can be leveraged as described herein to select an adhesive that can satisfy a desired open time (defined, e.g., as an amount of time available before an adhesive reaches a particular lap shear strength).

In some embodiments, the thermal load (heating) of an adhesive, an adjacent component, and/or a preexisting rail can be actively monitored via attached and/or embedded sensors, such as thermocouples (not separately shown). In some embodiments, the measured temperature can be compared against a predetermined target or limit, such as, for example, a curing temperature for the adhesive and/or a maximum cell temperature for a battery pack. In some embodiments, a temperature applied to an adhesive via adjacent component heating can be controlled via modifying a charging current of a battery (refer to FIG. 2) and/or a temperature and/or a flowrate of a heating fluid (refer to FIG. 3). In some embodiments, the temperature applied via the preexisting rail can be modified in this manner responsive to a measured temperature of the respective adhesive and/or a soak time (e.g., the elapsed time the adhesive has been heated). For example, the temperature and/or a flowrate of a heating fluid can be increased to increase heat transfer into the adhesive or decreased to decrease heat transfer into the adhesive as needed. In some embodiments, the temperature and/or a flowrate of the heating fluid and/or a charging rate/current can be actively adjusted until the adhesive reaches a desired bond strength (according, e.g., to a cure curve, refer to FIG. 4). In some embodiments, the temperature and/or a flowrate of the heating fluid and/or a charging rate/current can be actively adjusted to maintain a desired temperature for a designed soak time.

Figure 5:
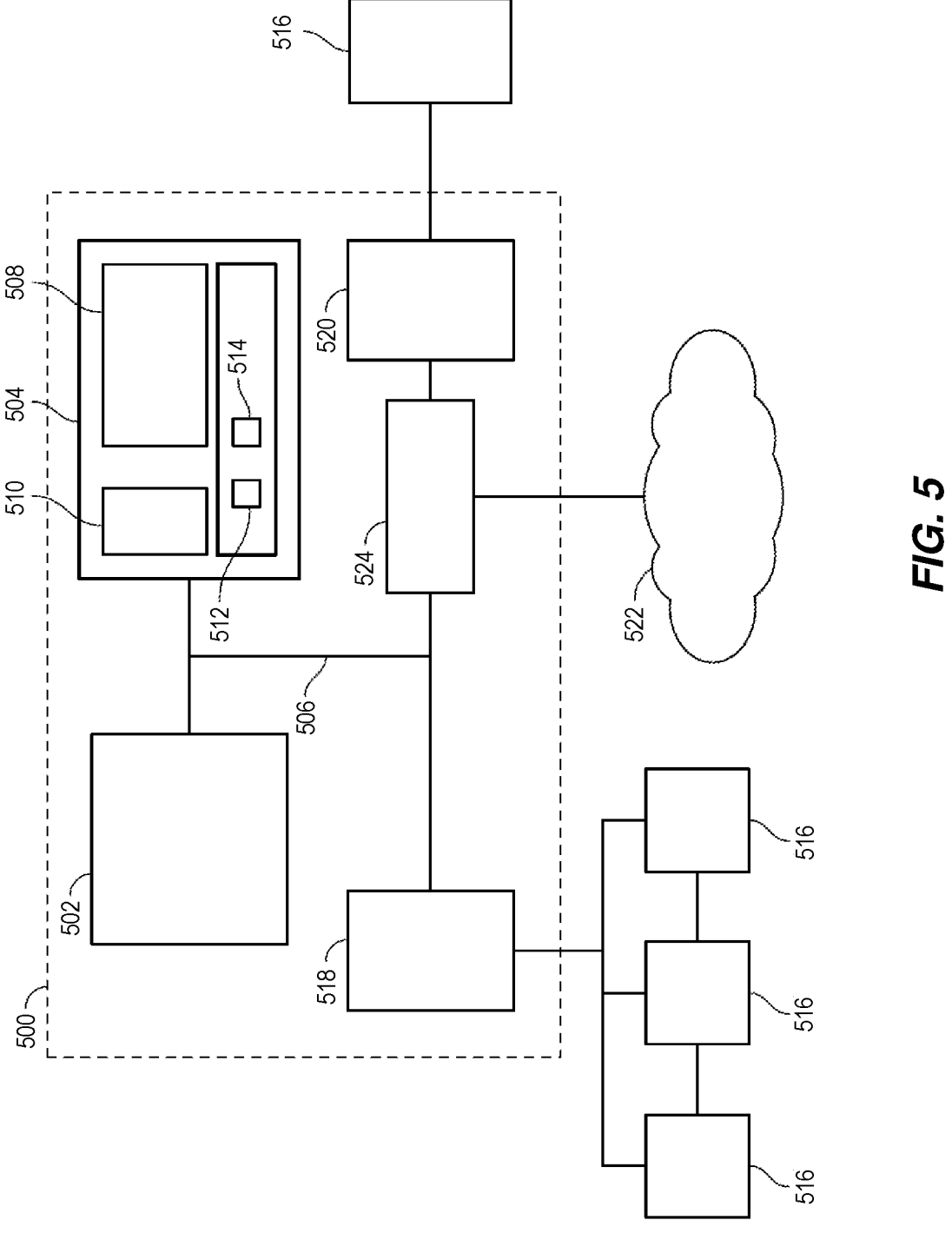
FIG. 5. is a computer system according to one or more embodiments.

FIG. 5 illustrates aspects of an embodiment of a computer system 500 that can perform various aspects of embodiments described herein. In some embodiments, the computer system 500 can be incorporated as an external system (e.g., as a module communicatively coupled to the vehicle 100 and/or battery pack 108) and/or as an internal system (e.g., as an electronic control unit or ECU of the vehicle 100 of FIG. 1). In some embodiments, the computer system 500 can be configured to receive signals (e.g., an adhesive temperature, a component temperature, etc.) from one or more cells or components of a battery pack.

The computer system 500 includes at least one processing device 502, which generally includes one or more processors for performing a variety of functions, such as, for example, controlling power delivery of an electric motor (e.g., the electric motor 106 of FIG. 1) to one or more wheels of a vehicle (e.g., the vehicle 100), controlling charge/discharge rates of one or more batteries (e.g., the battery pack 108 of FIG. 1), controlling heating fluid delivery (temperature and flow rate) to an adjacent component (e.g., the cooling plate 216) of an adhesive layer (e.g., the adhesive layer 218), and/or monitoring a status (e.g., temperature) of the adhesive or any other component (e.g., cells) of the battery pack.

Components of the computer system 500 include the processing device 502 (such as one or more processors or processing units), a system memory 504, and a bus 506 that couples various system components including the system memory 504 to the processing device 502. The system memory 504 may include a variety of computer system readable media. Such media can be any available media that is accessible by the processing device 502, and includes both volatile and non-volatile media, and removable and non-removable media.

For example, the system memory 504 includes a non-volatile memory 508 such as a hard drive, and may also include a volatile memory 510, such as random access memory (RAM) and/or cache memory. The computer system 500 can further include other removable/non-removable, volatile/non-volatile computer system storage media.

The system memory 504 can include at least one program product having a set (e.g., at least one) of program modules that are configured to carry out functions of the embodiments described herein. For example, the system memory 504 stores various program modules that generally carry out the functions and/or methodologies of embodiments described herein. A module or modules 512, 514 may be included to perform functions related to monitoring and/or control of the battery pack 108, such as, for example, determining one or more current cell temperatures, a current state of charge for the battery pack 108 and/or any cell of the battery pack 108, a charging duration, a charging current and/or voltage, etc. The computer system 500 is not so limited, as other modules may be included depending on the desired functionality of the vehicle 100. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. For example, the module(s) can be configured via software, hardware, and/or firmware to stop charging and/or otherwise isolate one or more cells of a battery pack of the vehicle 100.

The processing device 502 can also be configured to communicate with one or more external devices 516 such as, for example, a keyboard, a pointing device, and/or any devices (e.g., a network card, a modem, vehicle ECUs, etc.) that enable the processing device 502 to communicate with one or more other computing devices. Communication with various devices can occur via Input/Output (I/O) interfaces 518 and 520.

The processing device 502 may also communicate with one or more networks 522 such as a local area network (LAN), a general wide area network (WAN), a bus network and/or a public network (e.g., the Internet) via a network adapter 524. In some embodiments, the network adapter 524 is or includes an optical network adaptor for communication over an optical network. It should be understood that although not shown, other hardware and/or software components may be used in conjunction with the computer system 500. Examples include, but are not limited to, microcode, device drivers, redundant processing units, external disk drive arrays, RAID systems, and data archival storage systems, etc.

Figure 6:
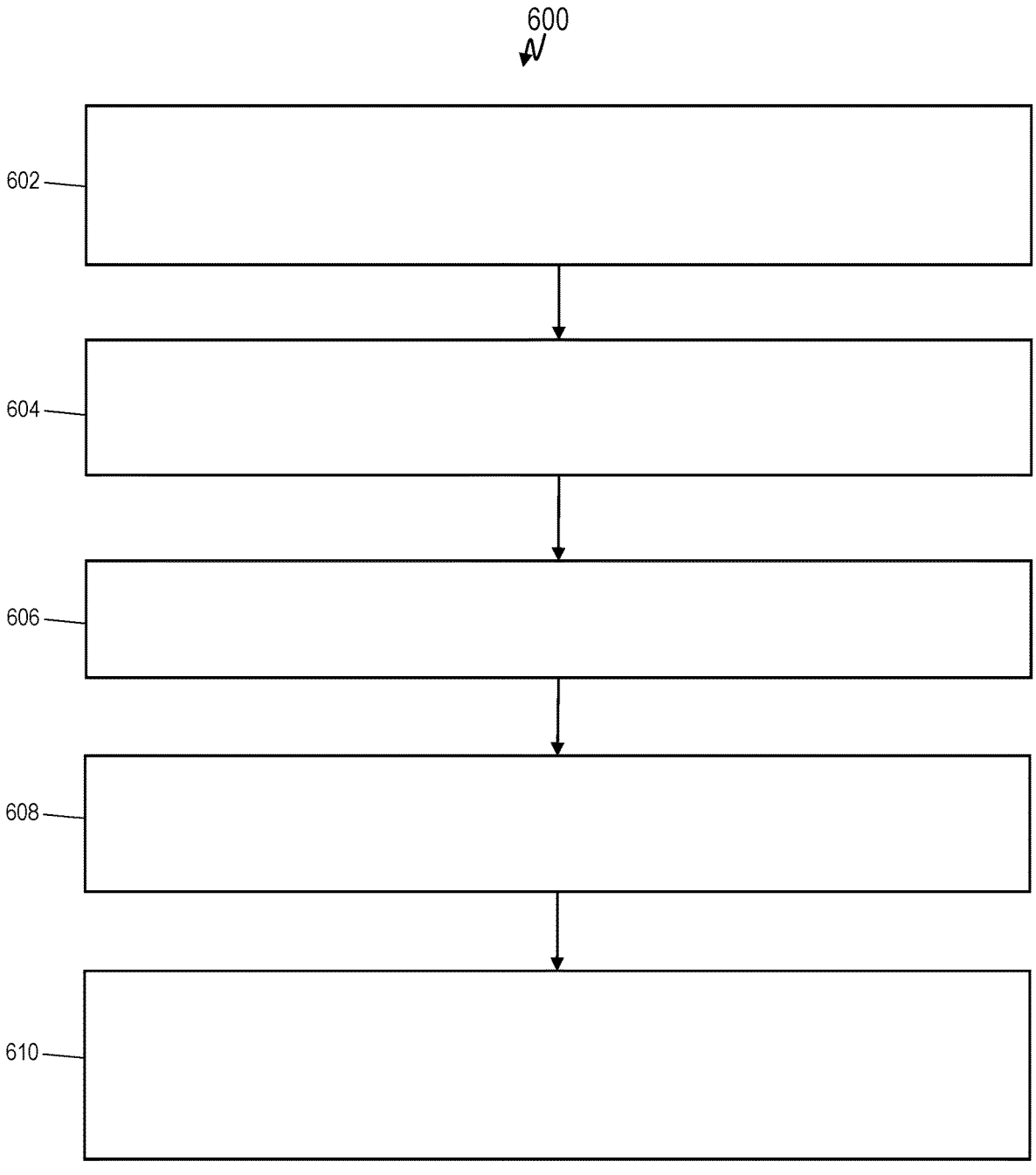
FIG. 6 is a flowchart in accordance with one or more embodiments.

Referring now to FIG. 6, a flowchart 600 for accelerating the cure time of an adhesive via adjacent component heating is generally shown according to an embodiment. Although depicted in a particular order, the blocks depicted in FIG. 6 can be rearranged, subdivided, and/or combined.

At block 602, the method includes receiving a battery pack and a thermal management system including a cooling plate, an upper tray, and a lower tray joined to opposite surfaces of the cooling plate to define an enclosed volume therebetween.

At block 604, the method includes wetting an interface between the battery pack and the thermal management system with an adhesive.

At block 606, the method includes joining the battery pack to the thermal management system at the interface.

At block 608, the method includes directing a heating fluid through the enclosed volume, thereby heating the adhesive. In some embodiments, the method includes coupling the cooling plate to a leak check machine and directing heated air through the enclosed volume. In some embodiments, the enclosed volume includes one or more fluid flow channels, a fluid inlet, and a fluid outlet for circulation of the heating fluid.

At block 610, the method includes, responsive to determining that a temperature of the adhesive has reached a target temperature, maintaining the temperature for a soak time according to a cure curve of the adhesive to achieve a target bond strength.

In some embodiments, the method includes generating a cure curve for a plurality of adhesives at one or more temperatures, each cure curve defining a bond strength of the respective adhesive as a function of cure time.

In some embodiments, the method includes determining a target open time and selecting the adhesive from the plurality of adhesives according to the target open time and the respective cure curves.

In some embodiments, the method includes selecting the adhesive that satisfies the target open time at a known manufacturing temperature.

In some embodiments, the method includes adjusting one or more of a flowrate and a temperature of the heating fluid responsive to the temperature of the adhesive.

Figure 7:
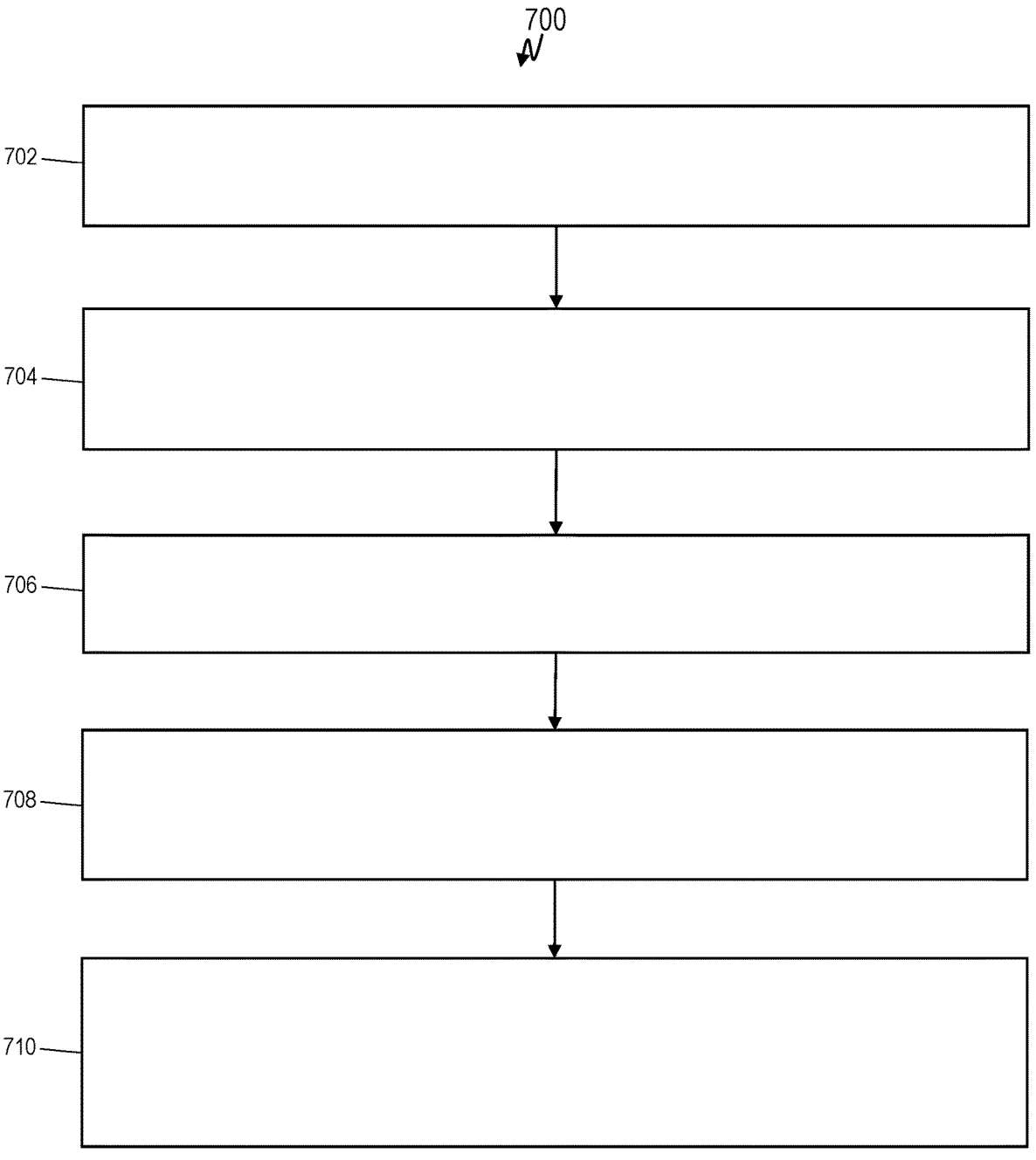
FIG. 7 is a flowchart in accordance with one or more embodiments.

Referring now to FIG. 7, a flowchart 700 for accelerating the cure time of an adhesive via adjacent component heating is generally shown according to an embodiment. Although depicted in a particular order, the blocks depicted in FIG. 7 can be rearranged, subdivided, and/or combined.

At block 702, the method includes receiving a first battery cell and a second battery cell.

At block 704, the method includes wetting an interface between the first battery cell and the second battery cell with an adhesive.

At block 706, the method includes joining the first battery cell and the second battery cell at the interface.

At block 708, the method includes directing a charging current to at least one of the first battery cell and the second battery cell, thereby heating the adhesive. In some embodiments, the method includes coupling the first battery cell and the second battery cell to a charge port and directing a DCFC to the first battery cell and the second battery cell via the charge port. In some embodiments, the DCFC directed to the first battery cell and the second battery cell is a first DCFC of a vehicle battery pack that includes the first battery cell and the second battery cell.

At block 710, the method includes, responsive to determining that a temperature of the adhesive has reached a target temperature, maintaining the temperature for a soak time according to a cure curve of the adhesive to achieve a target bond strength.

In some embodiments, the method includes generating a cure curve for a plurality of adhesives at one or more temperatures, each cure curve defining a bond strength of the respective adhesive as a function of cure time.

In some embodiments, the method includes determining a target open time and selecting the adhesive from the plurality of adhesives according to the target open time and the respective cure curves.

In some embodiments, the method includes selecting the adhesive that satisfies the target open time at a known manufacturing temperature.

In some embodiments, the method includes adjusting the charging current responsive to the temperature of the adhesive.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for accelerating a cure time of an adhesive, the method comprising:
    receiving a battery pack and a thermal management system comprising a cooling plate, an upper tray, and a lower tray joined to opposite surfaces of the cooling plate to define an enclosed volume therebetween;
    wetting an interface between the battery pack and the thermal management system with an adhesive;
    joining the battery pack to the thermal management system at the interface;
    applying a two-step cure acceleration process comprising:
        prior to a first charge cycle of the battery pack, directing a heating fluid through preexisting rails in the enclosed volume for a time equal to a difference between an adhesive open time and a time to fixture strength for the adhesive, thereby heating the adhesive during a first phase; and
        during the first charge cycle of the battery pack, holding the battery pack at a temperature selected according to a cure curve of the adhesive, thereby heating the adhesive during a second phase; and
    during the two-step cure acceleration process, responsive to determining that a temperature of the adhesive has reached a target temperature, maintaining the temperature of the adhesive for a soak time according to the cure curve of the adhesive to achieve a target bond strength.

2. The method of claim 1, further comprising generating a cure curve for a plurality of adhesives at one or more temperatures, each cure curve defining a bond strength of the respective adhesive as a function of cure time.

3. The method of claim 2, further comprising:
    determining a target open time; and
    selecting an adhesive from the plurality of adhesives according to the target open time and the respective cure curves.

4. The method of claim 3, wherein selecting an adhesive comprises selecting the adhesive that satisfies the target open time at a known manufacturing temperature.

5. The method of claim 1, wherein directing a heating fluid through the enclosed volume comprises coupling the cooling plate to a leak check machine and directing heated air through the enclosed volume.

6. The method of claim 1, wherein the enclosed volume comprises one or more fluid flow channels, a fluid inlet, and a fluid outlet for circulation of the heating fluid.

7. The method of claim 1, further comprising adjusting one or more of a flowrate and a temperature of the heating fluid responsive to the temperature of the adhesive.

8. A method for accelerating a cure time of an adhesive, the method comprising:
    receiving a first battery cell and a second battery cell;
    wetting an interface between the first battery cell and the second battery cell with an adhesive;
    joining the first battery cell and the second battery cell at the interface;
    applying a two-step cure acceleration process comprising:
        directing a charging current to at least one of the first battery cell and the second battery cell for a time equal to a difference between an adhesive open time and a time to fixture strength for the adhesive, thereby heating the adhesive; and
        directing a heating fluid through preexisting rails in a thermal management system coupled to at least one of the first battery cell and the second battery cell; and
    responsive to determining that a temperature of the adhesive has reached a target temperature, maintaining the temperature of the adhesive for a soak time according to a cure curve of the adhesive to achieve a target bond strength.

9. The method of claim 8, further comprising generating a cure curve for a plurality of adhesives at one or more temperatures, each cure curve defining a bond strength of the respective adhesive as a function of cure time.

10. The method of claim 9, further comprising:
    determining a target open time; and
    selecting an adhesive from the plurality of adhesives according to the target open time and the respective cure curves.

11. The method of claim 10, wherein selecting an adhesive comprises selecting the adhesive that satisfies the target open time at a known manufacturing temperature.

12. The method of claim 8, wherein directing a charging current comprises coupling the first battery cell and the second battery cell to a charge port and directing a Direct Current Fast Change (DCFC) to the first battery cell and the second battery cell via the charge port.

13. The method of claim 12, wherein the DCFC directed to the first battery cell and the second battery cell is a first DCFC of a vehicle battery pack comprising the first battery cell and the second battery cell.

14. The method of claim 8, further comprising adjusting the charging current responsive to the temperature of the adhesive.

15. A system comprising:
    a vehicle comprising:
        an electric motor;
        a battery pack electrically coupled to the electric motor, the battery pack comprising a first battery cell and a second battery cell; and
        a thermal management system coupled to the battery pack, the thermal management system comprising a cooling plate, an upper tray, and a lower tray joined to opposite surfaces of the cooling plate to define an enclosed volume therebetween; and
    a memory, computer readable instructions, and one or more processors for executing the computer readable instructions, the computer readable instructions controlling the one or more processors to perform operations comprising:
        heating a component of the vehicle adjacent to an adhesive, wherein heating the component comprises:

prior to a first charge cycle of the battery pack, directing a heating fluid through the enclosed volume to heat the cooling plate, thereby heating the adhesive; and during the first charge cycle of the battery pack, directing a charging current to at least one of the first battery cell and the second battery cell to heat the respective first battery cell and second battery cell for a time equal to a difference between an adhesive open time and a time to fixture strength for the adhesive, thereby heating the adhesive;

measuring a temperature of the adhesive; and responsive to determining that the temperature of the adhesive has reached a target temperature, maintaining the temperature of the adhesive for a soak time according to a cure curve of the adhesive to achieve a target bond strength.

16. The system of claim 15, wherein the operations further comprise generating a cure curve for a plurality of adhesives at one or more temperatures, each cure curve defining a bond strength of the respective adhesive as a function of cure time.

17. The system of claim 16, wherein the operations further comprise:

determining a target open time; and selecting an adhesive from the plurality of adhesives according to the target open time and the respective cure curves.

18. The system of claim 17, wherein selecting the adhesive comprises selecting an adhesive that satisfies the target open time at a known manufacturing temperature.

19. The system of claim 15, wherein directing a heating fluid through the enclosed volume comprises coupling the cooling plate to a leak check machine and directing heated air through the enclosed volume.

20. The system of claim 15, wherein directing a charging current comprises coupling the first battery cell and the second battery cell to a charge port and directing a Direct Current Fast Change (DCFC) to the first battery cell and the second battery cell via the charge port.

* * * * *